(12) United States Patent
Hammer et al.

(10) Patent No.: US 10,485,229 B2
(45) Date of Patent: Nov. 26, 2019

(54) SPRAY BOOM NOZZLE CONTROL

(71) Applicant: Deere & Company, Moline, IL (US)

(72) Inventors: Curtis R. Hammer, Ankeny, IA (US); Patrick J. Fisher, West Des Moines, IA (US); Richard A. Humpal, Ankeny, IA (US); Dolly Y. Wu, Silvis, IL (US)

(73) Assignee: Deere & Company, Moline, IL (US)

( * ) Notice: Subject to any disclaimer, the term of this patent is extended or adjusted under 35 U.S.C. 154(b) by 115 days.

(21) Appl. No.: 14/716,071

(22) Filed: May 19, 2015

(65) Prior Publication Data
US 2016/0338335 A1 Nov. 24, 2016

(51) Int. Cl.
| | |
|---|---|
| *A01M 7/00* | (2006.01) |
| *B06B 1/20* | (2006.01) |
| *B05B 13/00* | (2006.01) |
| *B05B 1/20* | (2006.01) |

(52) U.S. Cl.
CPC ............ *A01M 7/0089* (2013.01); *A01M 7/00* (2013.01); *B05B 1/20* (2013.01); *B05B 13/005* (2013.01)

(58) Field of Classification Search
CPC .... A01M 7/0089; A01M 7/00; A01M 7/0084; B05B 1/20; B05B 13/005; B05B 12/002; B05B 12/04
USPC .... 239/155, 176, 159–172, 67, 69, 561–564
See application file for complete search history.

(56) References Cited

U.S. PATENT DOCUMENTS

| | | | |
|---|---|---|---|
| D42,874 S | 8/1912 | McCance | |
| 3,913,836 A * | 10/1975 | Stevenson | A01M 7/0089 239/166 |
| 4,044,952 A | 8/1977 | Williams et al. | |
| 4,052,003 A * | 10/1977 | Steffen | A01M 7/0089 239/155 |
| 4,717,870 A * | 1/1988 | Vuncannon | G01N 33/367 118/712 |
| 5,098,018 A * | 3/1992 | Hadar | A01M 7/0014 180/89.13 |
| 5,310,113 A | 5/1994 | Cowgur | |
| 5,911,362 A * | 6/1999 | Wood | A01M 7/0089 239/1 |
| 6,226,582 B1 | 5/2001 | Adsett et al. | |
| 6,749,128 B1 * | 6/2004 | Oosterman | A01C 23/047 239/155 |
| 6,776,355 B2 | 8/2004 | Ringer et al. | |
| 7,040,552 B2 | 5/2006 | McCrea et al. | |

(Continued)

FOREIGN PATENT DOCUMENTS

| | | |
|---|---|---|
| EP | 1486848 A1 | 12/2004 |
| GB | 2244742 A | 12/1991 |

OTHER PUBLICATIONS

European Search Report in foreign counterpart application 16168622.5, dated Sep. 28, 2016 (8 pages).

(Continued)

*Primary Examiner* — Chee-Chong Lee
*Assistant Examiner* — Joseph A Greenlund

(57) ABSTRACT

An example embodiment includes an agricultural sprayer having a boom that supports many sections of fluid distribution pipes and an even larger number of spray nozzles. Various activities related to the spray nozzles are enabled or disabled using infinity switches or slide configurations that are mounted an operator seat armrests or on remote controllers.

20 Claims, 9 Drawing Sheets

(56) References Cited

U.S. PATENT DOCUMENTS

| | | | | |
|---|---|---|---|---|
| 7,142,966 B2* | 11/2006 | Saller | ............... | A01B 79/005 701/50 |
| 7,440,767 B2 | 10/2008 | Ballay et al. | | |
| 7,502,665 B2* | 3/2009 | Giles | ............... | A01B 79/005 700/241 |
| 7,872,587 B2* | 1/2011 | Hindryckx | ............... | A01D 41/127 340/684 |
| 8,028,927 B2* | 10/2011 | Ward | ............... | A01M 7/0089 239/1 |
| 8,191,795 B2* | 6/2012 | Grimm | ............... | A01M 7/0089 239/1 |
| 8,777,126 B2* | 7/2014 | Ringer | ............... | F16J 12/00 239/147 |
| 9,339,023 B2* | 5/2016 | Ballu | ............... | A01M 7/0057 |
| 9,445,540 B2* | 9/2016 | Ballu | ............... | A01M 7/0042 |
| 9,884,330 B2* | 2/2018 | Humpal | ............... | B05B 1/30 |
| 2004/0016822 A1* | 1/2004 | Ringer | ............... | A01M 7/0089 239/159 |
| 2004/0195357 A1* | 10/2004 | Doherty | ............... | A01C 17/00 239/172 |
| 2005/0189432 A1* | 9/2005 | Kime | ............... | E01H 10/007 239/1 |
| 2006/0118654 A1* | 6/2006 | Shivak | ............... | A01C 23/008 239/166 |
| 2009/0065603 A1 | 3/2009 | Ward et al. | | |
| 2012/0256843 A1* | 10/2012 | Epple | ............... | A01D 41/127 345/169 |
| 2015/0157004 A1* | 6/2015 | Hiddema | ............... | A01M 7/00 239/159 |
| 2015/0216118 A1* | 8/2015 | Swinney, II | ............... | B05B 15/20 239/159 |
| 2016/0309647 A1* | 10/2016 | Bittner | ............... | A01C 23/047 |
| 2016/0338335 A1* | 11/2016 | Hammer | ............... | B05B 1/20 |
| 2017/0231148 A1* | 8/2017 | Miwa | ............... | A01B 63/02 239/164 |

OTHER PUBLICATIONS

Reliable Thumbwheel with Easy-to-Mount Assembly. Product brochure [online]. Omron, 2001 [retrieved on Apr. 22, 2015]. Retrieved from the Internet: <https://echannel.omron247.com/marcom/pdfcatal.nsf/PDFLookupByUniqueID/86E9084BDB63422C86256A54006E1554/$File/D22A7BS0401.pdf>.

* cited by examiner

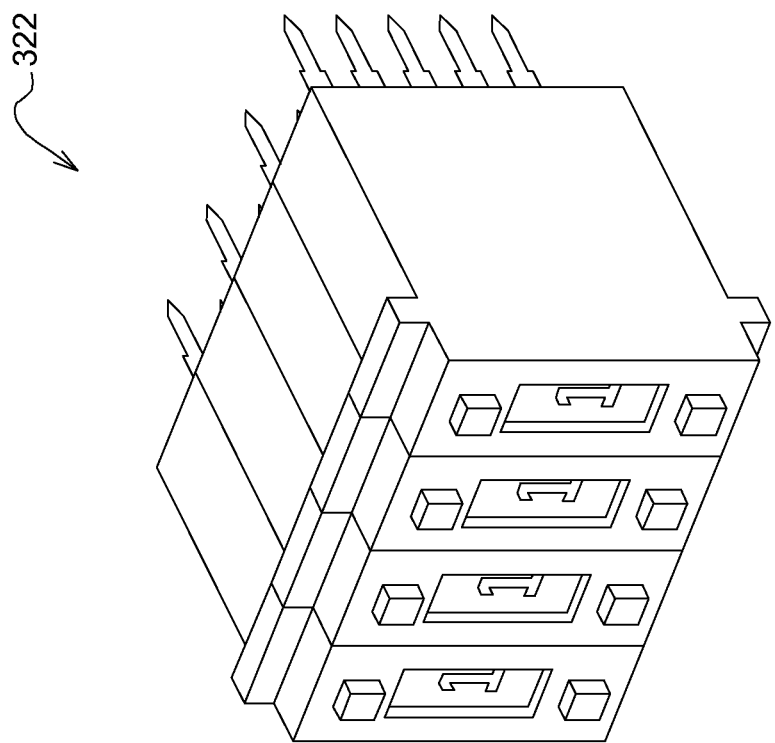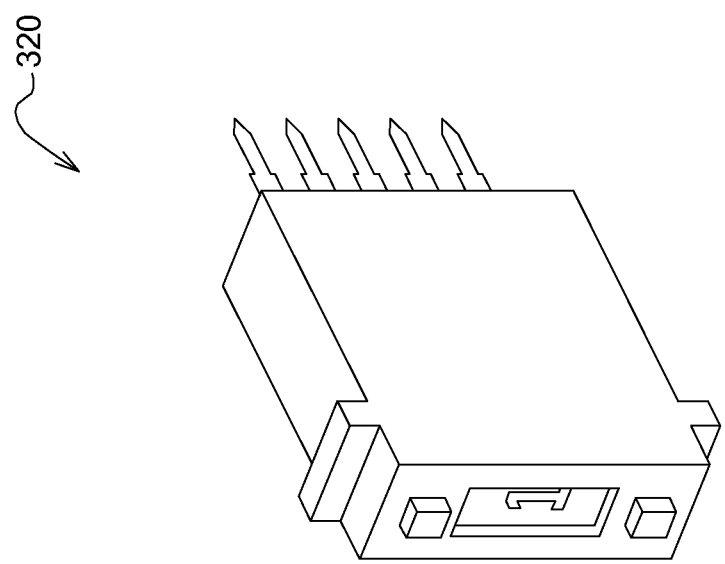
FIG. 9

SPRAY BOOM NOZZLE CONTROL

FIELD

This disclosure relates generally to multi-section spray booms and spray nozzle control although various aspects can also be applied to a control of the motion or downforce on, for example disks, on implements such as a tillage cultivator or a seed planter.

BACKGROUND

Large system sprayers apply nutrients, herbicides, paints, chemicals and other liquids such as those used in the agriculture or manufacturing industries. The sprayers may have a boom with multiple spray sections, and many nozzles within each section. Controlling the operation of such large systems is often difficult or unwieldy, even more so when the sprayer operator is wearing gloves or performing other tasks (e.g. driving, taking data, eating). Further, with so many individual spray sections and nozzles, their operation and adjustment require a considerable amount of controller panel space. There are additional problems such as manufacturing ease, costs, and ease of operator training.

SUMMARY

Various aspects of example embodiments are set out in the claims. Embodiments include a spray switching system to rapidly and intuitively operate a relatively large sprayer such as those used in agriculture or industrial applications, wherein the system includes individual spray area control for many sections or many individual nozzles. Turning on/off the spray and rotating the spray nozzles are some of the operations that are actuated by the section and nozzle control. One embodiment includes infinite control via a circular wheel or scroll wheel switches in an armrest of the operator seat region. Another embodiment includes rotary wheels or thumbwheels in a remote key fob. Another embodiment includes slide switches or software versions. Yet other embodiments include a combination of these embodiments.

BRIEF DESCRIPTION OF THE DRAWINGS

The detailed description refers to the following example figures:

FIG. 9 depicts an example pushwheel switch.

DETAILED DESCRIPTION

Embodiments of a master control or switch is used to rapidly and intuitively control the spray nozzles on an entire spray boom. In some embodiments, the controls include electro-mechanical infinity switches such as infinitely rotatable scroll wheels, rotary knobs or touchscreen images. When scrolled or rotated in opposite directions, each infinity control enables or disables any number of sections or individual nozzles to be controlled along opposing directions on a boom, free of dynamic range (resolution) issues or endpoint cutoff problems. In additional examples, individual nozzles or sections are directly addressed by pushwheel or dial switches. In some examples, the controls are ergonomically located on an armrest near the operator chair. Alternatively, similar controls are compactly located on a fob or other remote control such as for situations when the operator walks around to survey the boom and spray drift. Also, the operator may look rearward (if the booms are placed behind the vehicle) while conveniently still be able to control the nozzles. The controls serve to turn the spray flow on or off. Other options include valve control for pulse-controlled nozzles or rotating the nozzles so that different nozzle tips release fluid. A linear or angular position along or around the boom, fluid pressure and other aspects of the nozzles may also be controlled by the infinity switches. After testing, it was found that controlling the operation of spray systems with infinity wheels and pushwheel switches or even slide-pot controllers is both natural and intuitive. Placing the controls on the armrest is more ergonomic and induces less product-liability issues of accidental maneuvers that may occur with a handle or joy-stick that are also used to control the driving functions. Further, large sprayers may have many individual spray sections and nozzles to be controlled, and using separate switches for each section or nozzle has been found to require a considerable amount of space, which prevents ideally locating the switches in a convenient or suitable location.

Figure 1:
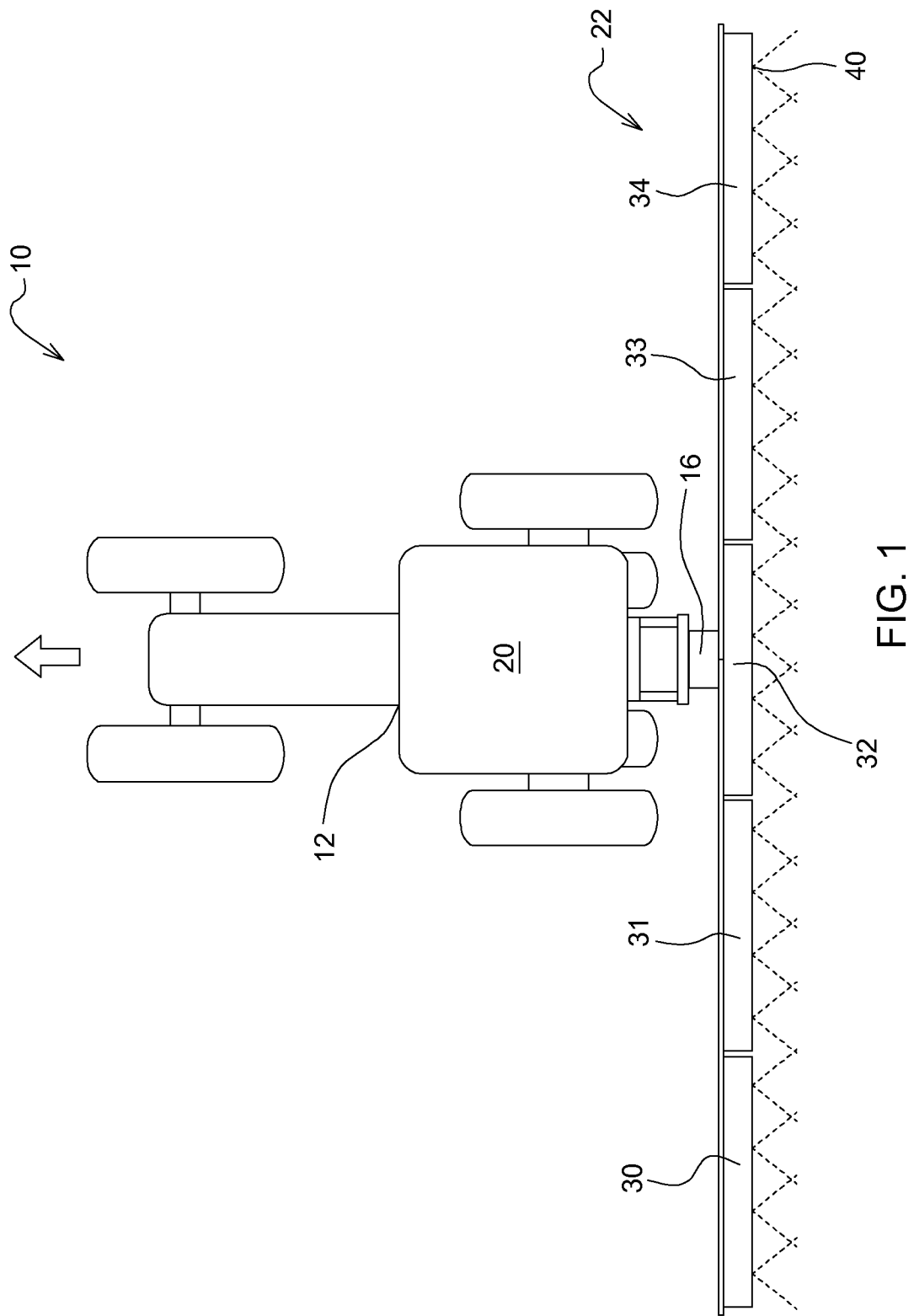
FIG. 1 depicts an example vehicle carrying a spray boom with spray nozzles mounted on the boom.

FIG. 1 depicts an example vehicle carrying a spray boom with spray nozzles mounted on the boom. The vehicle may be a platform or dolly for industrial spray applications or a tractor towing ground-engaging tillage left/right wings with disks and shanks, or a planter towing a row of seed dispenser modules. Or discussion purposes, the example vehicle is a towed sprayer or a self-propelled agricultural sprayer 10 including a vehicle main frame 12 and an attached autonomous control station or an operator cab 20. A fixed or floating center frame 16 is connected to a front or a rear of the frame 12; the center frame 16 supports an articulated folding spray boom 22 that is shown in the fully extended working position for spraying a field. In other examples, the spray boom 22 is mounted in front of the agricultural sprayer 10. Many spray nozzles 40 are mounted along a fluid distribution pipe that is mounted to the spray boom 22. Each nozzle 40 usually has multiple spray outlets, each of which conducts fluid to a same-type or different-type of spray tip. The nozzles 40 on the example spray boom 22 are divided into groups or sections such as 30, 31, 32, 33, and 34 (or collectively "spray section(s) 30") that may be designated as either left hand sections (LHS, e.g. 30, 31, and left half of 32) or right hand sections (RHS, e.g. 33, 34, and right half of 32) relative to a central vertical axis of the center frame 16 or center section 32. Although only five sections are shown, there are usually more sections on a long boom 22 that is over some length such as 25 meters. The different spray sections 30 are assigned to either LHS or RHS and the enablement or disablement of the sections on each side is governed by a separate infinity switch (e.g. 60A or 60B). In some embodiments, the center section 32 is treated separately from the LHS or RHS sections, and additional switch (es) are used to address the center section 32 alone. Alternatively, the entire center section 32 is designated as either LHS or RHS. In another embodiment, the operation of the spray sections 30 is governed by one infinity switch enabling or disabling all the nozzles 40 going from left to right (or right to left) rather than divided up so that the left sections and right sections are governed by a separate switch (e.g. 60A or 60B).

Figure 2:
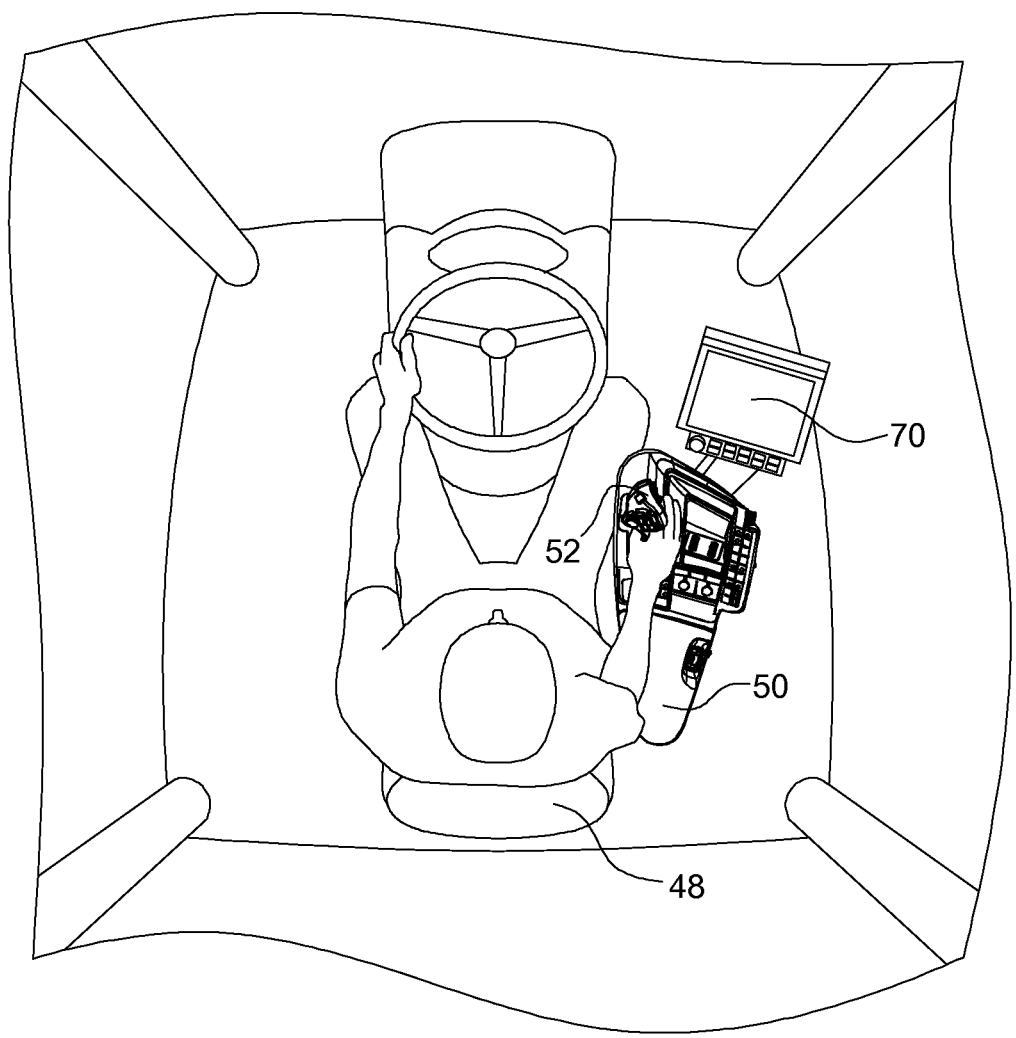
FIG. 2 depicts an overhead view of an example interior of a vehicle cab containing an operator seat, command seat arm, control handle and display screens.

FIG. 2 depicts an overhead view of an example interior of the operator cab 20 that includes an operator seat 48, a command armrest 50 that is usually attached to the right of the operator seat 48, a control handle 52 ahead of the armrest 50, and display screen(s) 70 near the vehicle steering wheel or near the left or right of the operator to adjacent to the window glass. A centralized computer or a sprayer control system is located in a number of possible locations (e.g. underneath the command armrest 50 or behind the display screen 70) for controlling various sprayer 10 and boom functions, along with collecting or storing data and algorithms for spraying and vehicle maneuvers. In other configurations, the display screen 70 is attached to the frontend of the armrest 50. Because there are more right-handed people, the armrest 50 is usually on the right hand side and out of the way of an operator entering the cab 20. The sturdy armrests may be used to assist the operator when he climbs into or moves around in the cabs 20 so that the spray control panels are positioned on whichever armrest that avoids accidental engagement of the control buttons and switches.

Figure 3:
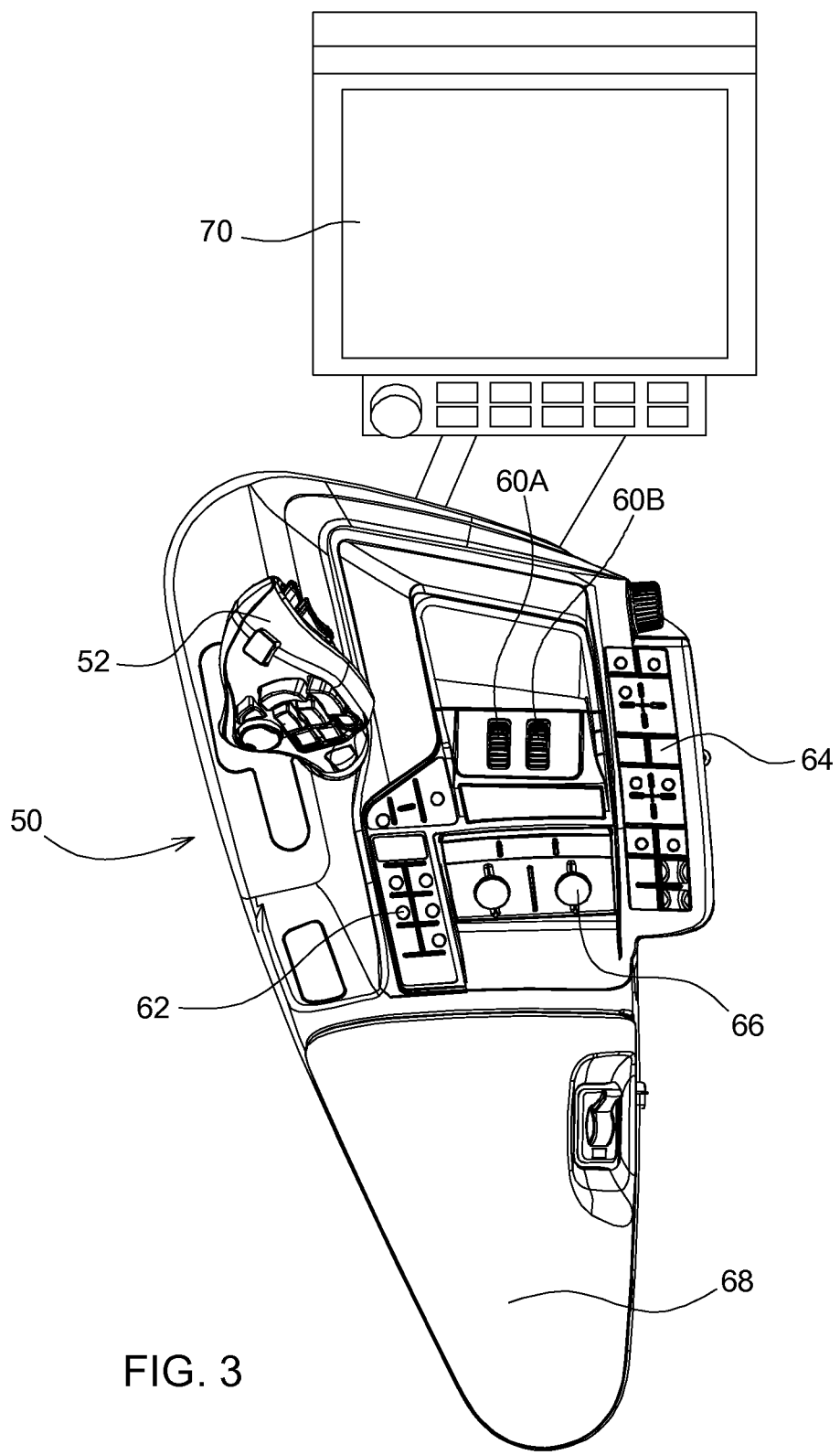
FIG. 3 depicts an example command seat arm with infinity switches, control handle and display screen.

FIG. 3 depicts an example command armrest 50 with electrical infinity switches 60A and 60B, panel switches 62, 64, 66, and control handle 52 and display screen 70, and an elbow rest 68. The infinity switches 60A and 60B are arranged in parallel with the wheels (or slide, etc.) motion-oriented in the same direction so that an operator can operate both left and right spray sections easily, simultaneously, such as with the index and middle fingers on one hand. For example, the operator would typically scroll both switches forward or both switches rearward to simultaneously turn on/off spray sections 30 on both sides of boom 20. The polarity (enable/disable) is arbitrarily assigned to either a forward versus a rearward scroll. The opposing outer sides of the infinity switches 60A and 60B span a width of about 2 to 3 inches (or less than 2 inches apart for small armrests or devices). The infinity switches 60A and 60B or the panel switches 62, 64, 66 are optionally covered by a slide-able visor. Or there is a sheath or membrane covering the buttons and switches, which prevents dust and crumbs from collecting or getting wedged in between or under the switches. The example infinity switches 60A and 60B are recessed downward to prevent being accidentally bumped. The visor or sheath also reduces the likelihood of any unintended contacts with or maneuvers of the switches. There is a gap around the switches 60A and 60B that is large enough for dirt and dust to pass around; there is also a hole in the bottom of the command armrest 50 for liquids or large particles to pass through. The infinity switches 60A and 60B include scroll wheels, thumb wheels, rotary switches, rotatable knob or dial, and so on. Bi-directional push buttons are another example infinity switch; they have a neutral flat position that does not actuate any activity, but depressing either end of the push button causes either ON or OFF activity. The example infinity switches 60A and 60B rotate continuously without limit so that there is no stopping point, either in one direction or in the opposite direction (e.g. scroll forward or scroll rearward relative to a direction of travel of the sprayer 10). By arbitrary designation, infinity switch 60A controls the left side (LHS) and 60B controls the right side (RHS) sections or nozzles 40. For example, scrolling the RHS switch 60A causes a change in a condition of the right side boom sections or spray nozzles one at a time across the full length of the right side of the boom or a section of a boom. Likewise, scrolling the LHS switch 60B causes a change in the condition (or a selected different condition) of the left side boom sections or spray nozzles. Scrolling both switches 60A and 60B such as using the index and middle fingers allows an operator to rapidly change a state of the spraying on both sides of the boom 22. In a different situation, such as if the sprayer 10 encounters hilly terrain or should be spraying asymmetrically, the operator can toggle only one of the switches 60A or 60B, but not both. Alternatively, the switches 60A or 60B can be combined with another command switch(es) or a software setting(s) so that scrolling only one of the switches (either 60A or 60B) changes the condition of all or a number of the spray sections 30 or spray nozzles 40. Example functions include turning on/off a nozzle 40 to release fluid, changing the flow pressure, changing the spray rate, pulsing the spray differently, rotating the nozzle head to select a particular type of spray tip, changing the pointing angle/direction of the nozzles 40, changing a selection of fluid, collecting data from each nozzle 40, turning on sensors and LED lights associated with each nozzle 40, and so on. A software setting (or even another physical switch) selects the type of function to be enabled. For example discussion purposes, the following text refers mostly to turning the fluid spray capability on (ON state) and off (OFF state), but the other functions are implemented and actuated as well. By arbitrary designation, turning a disc or knob counterclockwise or scrolling wheel infinity switches 60A and 60B forward in FIG. 3 causes a nozzle 40 to release spray (the ON state).

Figure 4:
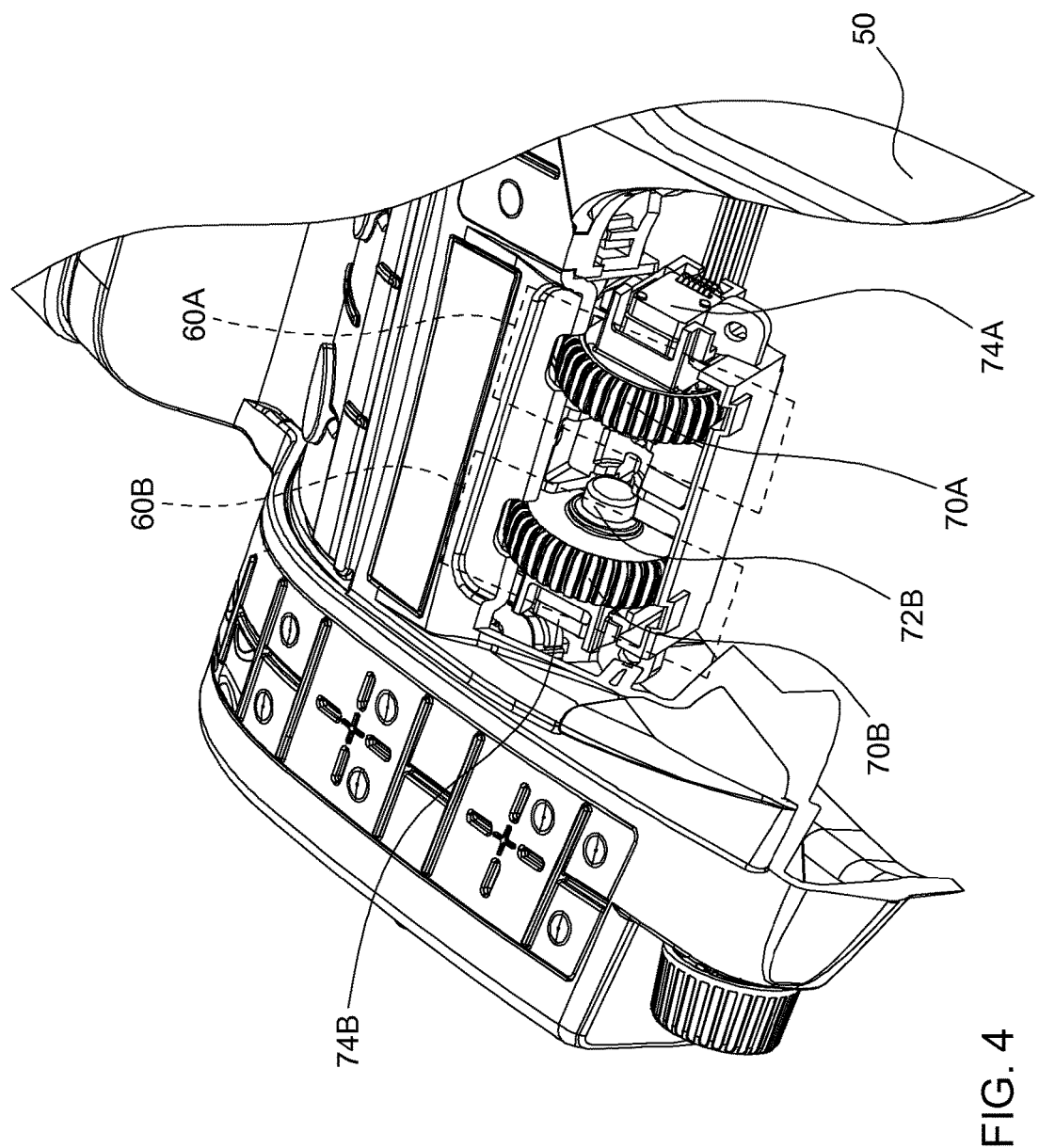
FIG. 4 depicts a top view of an example electro-mechanical structure underneath an infinity switch.

FIG. 4 depicts a top view of an example electro-mechanical structure underneath a pair of infinity switches 60A and 60B. A spoke wheel 70A and 70B is associated with the infinity switches 60A and 60B, respectively. Each spoke wheel 70A or 70B is mounted to its own spindle 72 to which its circuit module 74A or 74B are attached. Although the circuit modules 74A and 74B are depicted as being to the left of the spoke wheels 70A and 70B in FIG. 4, further space savings may be obtained by placing and staggering both circuit modules 74A and 74B in between the two spoke wheels 70A and 70B. The circuit modules 74A and 74B each includes or is electrically wired to a light emitter and light detector that are placed on opposite sides of each spoke wheel 70A and 70B. As the spoke wheels turn (when the infinity switches are scrolled), the spokes repeatedly break a light (or other electromagnetic signal) transmitted by the light emitter. The more the spoke wheel rotates, the more often the light beam is broken. The number of times the light beam is broken is correlated with the number of revolutions of the wheel (number of spokes passing a fixed point) and hence the distance of travel along the boom 22 and the number of nozzles 40 that are enabled or disabled. The light flashes detected are counted by comparator circuits and the number is digitized in the circuit modules 74A or 74B. The digitized result is sent to the centralized computer in the cab 20, which subsequently sends a ON/OFF signal on a communication bus (e.g. CAN bus) that is electrically wired to each nozzle 40 or to each spray section 30 being addressed and controlled. The digitized result is also converted into a nozzle monitoring number on the display screen 70 indicating which spray sections 30 or nozzles 40 are ON or OFF. To reduce the likelihood of signal interference, the frequency of the light generated and detected is, for example, selected to be in a narrow frequency range or a special frequency range.

In operation, the following is an example method of enabling or disabling the boom spray sections such as 30, 31, 32, 33, and 34. In an alternative embodiment, the center section 32 is split into 32A and 32B for the nozzles 40 that are positioned to the left and right, respectively, of the center vertical axis of the center section 32. A rearward roll of the LHS infinity switch 60B disables boom spray sections starting with the outermost left section, moving from left to right, and ending at the center 32 (or 32A). Previously disabled sections may be ignored. A forward roll of the LHS infinity switch 60A enables boom spray sections starting with the center section 32 (or 32A) and moving from right to left, and ending at the outermost left end section. Previously enabled sections may again be ignored. The center section 32 (or 32A) may be ignored if it is already enabled (e.g. by manual override, another control button or software GUI).

Operation of the right side parallels the example method of enabling and disabling the left side, a rearward roll on the RHS infinity switch 60B disables boom sections starting with the outermost right section and moving from right to left, and ending at the center section 32 (or 32B). Previously disabled sections may be ignored. A forward roll of the RHS infinity switch 60A enables boom sections starting with the center section 32 (or 32B) and moving from left to right, and ending at the outermost right end section. Previously enabled sections may again be ignored. The center section 32 (or 32B) may be ignored if it is already enabled (e.g. by a manual override, another control button or software button). The left hand LHS switch 60A counts upward when rotated forward. The right hand RHS switch 60B counts downwards when rotated forward. An alternative embodiment is instead asymmetric, where both the LHS and RHS infinity switches start from the leftmost end of its respective set of sections 30 or nozzles 40 and both, for example, goes left to right. Then both the left hand LHS infinity switch 60A and RHS infinity switch 60B count upward when rotated forward.

In operation to enable or disable individual nozzles 40, one example method is to follow the same methods as enabling and disabling individual spray sections 30. Each individual nozzle 40 is considered a spray "section" 30 so that the number of sections 30 equals the number of nozzles 40. Then scrolling the scroll wheels forward or rearward enables or disables the nozzles on the left side or right side of the central vertical axis of the center frame 16. If adjacent nozzles 40 are positioned close to each other along the boom 20 or there is sufficient spray overlap, in another embodiment, one option is to just enable every other nozzle 40 or every third nozzle 40. Another alternative example method is to enable or disable individual nozzles 40 within a section 30 to which the scroller has reached ("instant section"). Scrolling through sections 30 is designated as a section adjust, and scrolling through individual nozzles 40 is a nozzle adjust. An example implementation is to set up a companion switch (e.g. one of the switches in the panel of switches 64) that is electronically wired to enable toggling between a section adjust and a nozzle adjust. For example, scrolling rearward turns off the sections 30 when the section adjust is engaged. But continued scrolling rearward turns off the individual nozzles 40 within the instant section 30 or next section 30 after the section adjust is switched to nozzle adjust. If the nozzle adjust is switched back to section adjust, then continued scrolling rearward turns off the next individual section 30. Likewise, scrolling forward turns on the sections 30 or individual nozzles 40 depending on whether the section or nozzle adjust is enabled.

In another embodiment, the example companion switch (in the panel 64) that is used to toggle between spray section versus spray nozzle control is implemented as a multi-position switch such as a click-slide switch or a multi-selection switch or knob. Such multi-choice switches include additional options such as double the spray pressure, rotation nozzle angle, etc., along with section or nozzle choices.

An example method to target a specific nozzle 40 or section 30 includes multiple additional companion switches. For instance, if the nozzles 30 are in some state, and one of the many nozzles 30 needs to be changed to the other state (e.g. nozzle no. 67 among 120 nozzles; and nozzle no. 67 is in spray section no. 6). A decimal (base 10) pushwheel switch 320 or 322 (e.g. FIG. 9) has ten positions: 0-9. One of the positions 0-9 is selected by pushing the protruding buttons above (+) or below (−) the display numbers. Alternative pushwheels include finger-dial switches, barrel switches, round rotary switches, etc. A first pushwheel switch 320 addresses the boom spray section number. The next two pushwheel switches 320 address the nozzle number within a spray section 30. If there are less than eleven nozzles in a spray section 30, then only one pushwheel switch 320 is needed to address the nozzle number within the spray section 30. Alternatively, to reduce the number of physical switches, a hexadecimal (base 16) pushwheel switch 320 may be substituted for the decimal (base 10) switches, and sixteen nozzles are grouped together per section. As another alternative, a compact four-pack pushwheel switch 322 as depicted in FIG. 9 can be used. After the pushwheel switches 320 are set, then scrolling forward/rearward an infinity switch LHS 60A or RHS 60B turns on/off a nozzle on the left or right side of the boom, respectively. For more coarse control such as to reset only a specific spray section among many spray sections 30, the first pushwheel switch alone, can be used with a left and/or right scroll wheel to enable/disable the particular section. The pushwheel switches 320 are electronically decoded (e.g. 120 to 1) so that each nozzle is electrically wired to or associated with a unique one of the combination of digits that was selected by the operator using the pushwheel switches 320. In this manner, a particular nozzle 30 is selected to be enabled or disabled to perform spraying, pressure change, nozzle tip selection, position, spray rate and so on. A software setting selected via the centralized computer (or even another physical switch) invokes the type of action to be enabled.

Another example method to target a specific nozzle 40 or section 30 includes one additional companion switch and the status flags displayed, for example, on the display screen 70. The status flags indicate the enable/disable state of each nozzle 40 and section 30 for a particular characteristic (e.g. the nozzle tip, pressure, angle, flow rate, and so on). Either the individual nozzles 40 or spray sections 30 may be designated as a "selection" depending on whether an operator wants to address a particular nozzle or a particular spray section. Then scrolling the scroll wheels forward or rearward enables or disables the selection on the left side RHS or right side LHS. The additional companion switch determines whether to ignore the actions of the scroll wheels so that the operator can scroll to a particular selection by observing the status flags on the display screen 70. Once the operator reaches the desired selection (selected nozzle or section), then the operator can move the scroll wheel either forward or rearward to enable or disable the desired selection.

Figure 5:
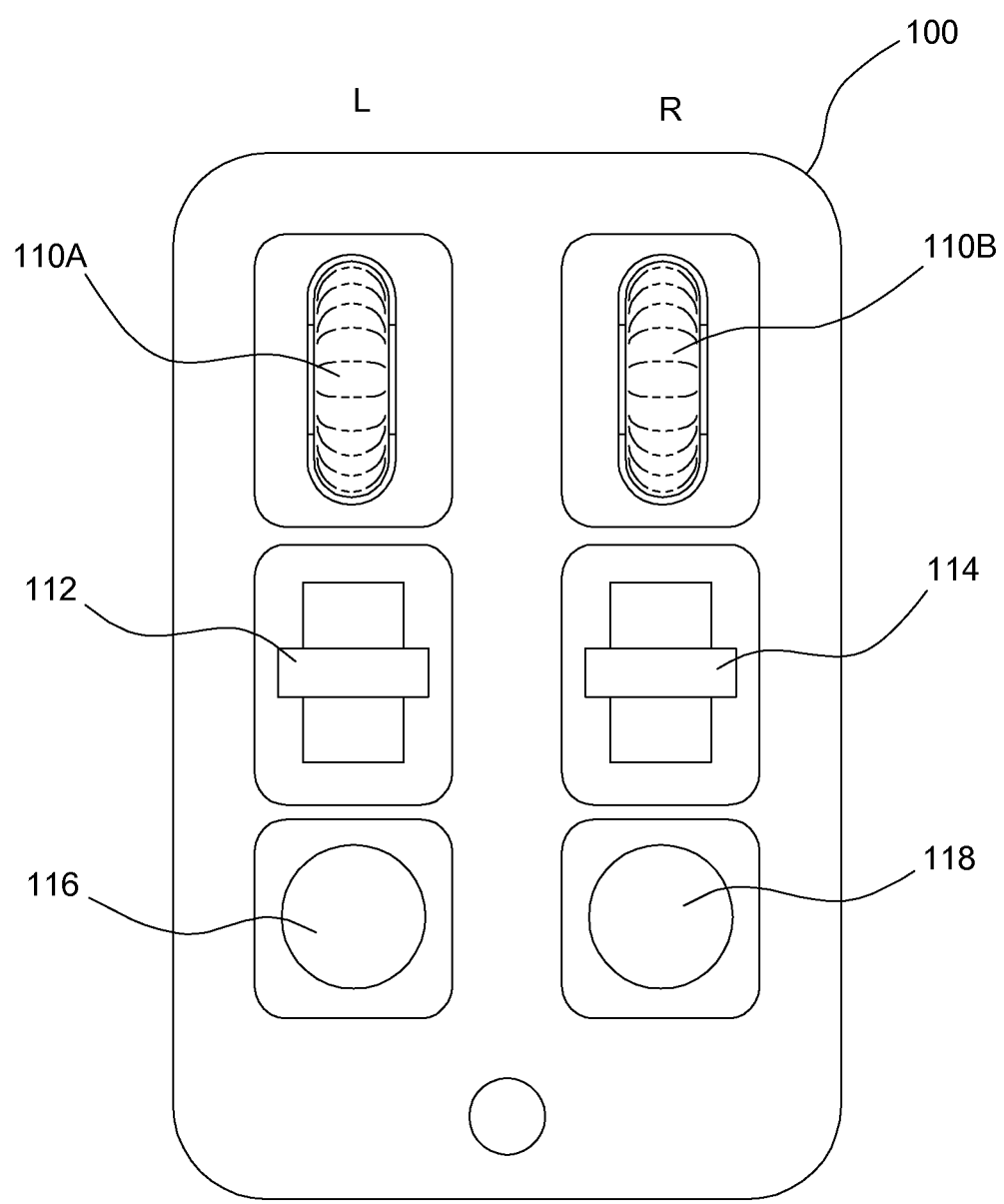
FIG. 5 depicts an example remote controller that controls the spray nozzles, where the controller includes infinity switches.

FIG. 5 depicts an example fob 100 or remote control (e.g. computational device at the farmhouse) that wirelessly operates the spray nozzles, where the fob 100 includes electromechanical infinity switches 110A and 110B. Remote controls or fobs 100 enable an operator to control the spray nozzles 40 while the operator is away from the cab 20, particularly when the operator is examining the boom 22 and nozzles 40 that appear to malfunction. The example fob 100 includes left LHS and right RHS scroll switches 110A and 110B along with additional companion switches 112 and 114 such as slide, gear switches or pushwheel switches to address a particular nozzle 40 or particular section 30. With MEMS technology or with miniaturized versions of the light transmission/detection methods described above (e.g. FIG. 4), smaller scroll switches may be implemented for a fob 100 than for an armrest 50. When voice recognition works very well, a voice-recognition commands implemented on the fob 100 or other remote control is an effective way to identify a particular nozzle or section. This voice-recognition scenario is discussed below in relation to the cellphone applications and computer GUIs.

The infinity switches 110A and 110B and companion switches on the example fob 100 work in a manner similar to the aforementioned methods for the infinity switches 60A and 60B. The fob is about 1.5 to 2 inches in width and about 3.5 to 4 inches in length. The infinity switches 110A and 110B are arranged in parallel and with the scroll wheels oriented in the same motion-direction. The signals are passed wirelessly to a nozzle central controller after the switch positions are selected. Due to space issues on a hand-held device limiting the number of buttons, by default, the buttons on the fob 100 addresses individual nozzles 40 rather than sections, although the circuitry in the fob 100 and the nozzles 40 (or nozzle central controller on the boom 22) can be re-programmed to address sections instead. Nozzles 40 are enabled or disabled sequentially. One example method starts the process when an operator presses the power button 118 (e.g. twice to reduce the problem of accidental activation of the fob 100). The sprayer 10 beeps to alert the operator that remote nozzle control is activated and control is passed from local cab 20 control to remote fob control. The nozzles 40 flashes if the nozzles 40 are equipped with LED lights. Fob 100 is now active and all the nozzles 40 are OFF. Fob 100 can now be used to sequence through individual nozzles from left to right (LHS switch 110A) or right to left (110B) by scrolling through the appropriate scroll switch or both scroll switches. The nozzles 40 may optionally flash to indicate that they have been enabled. Companion switches 112 and 114 are set up so that fob 100 can address (enable or disable) a particular nozzle or set of nozzles, much in a way similar to the aforementioned methods for controlling nozzles 40 from the cab's companion or pushwheel switch 320.

Figure 6:
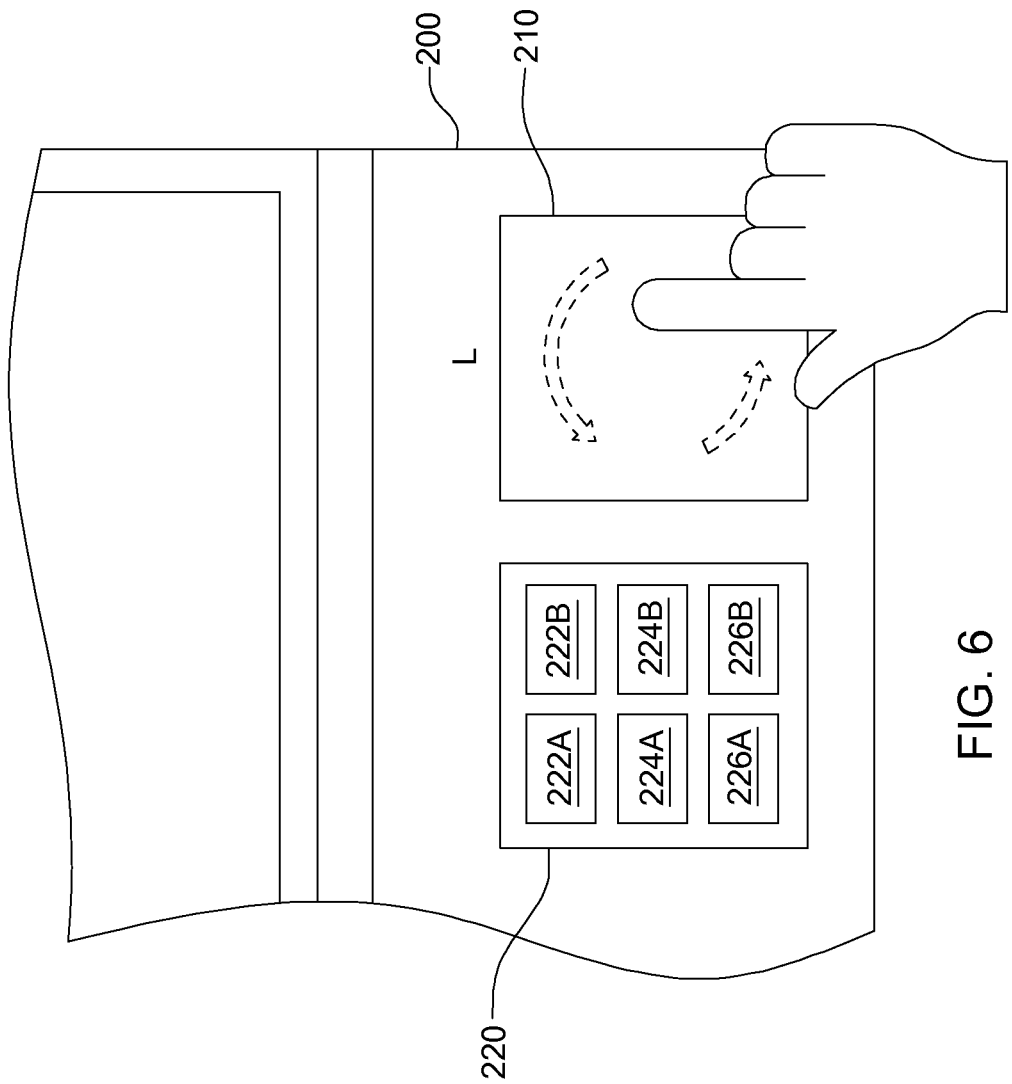
FIG. 6 depicts an example touchscreen panel that has controls for the spray nozzles, where the touchscreen includes infinity switches.
Figure 7:
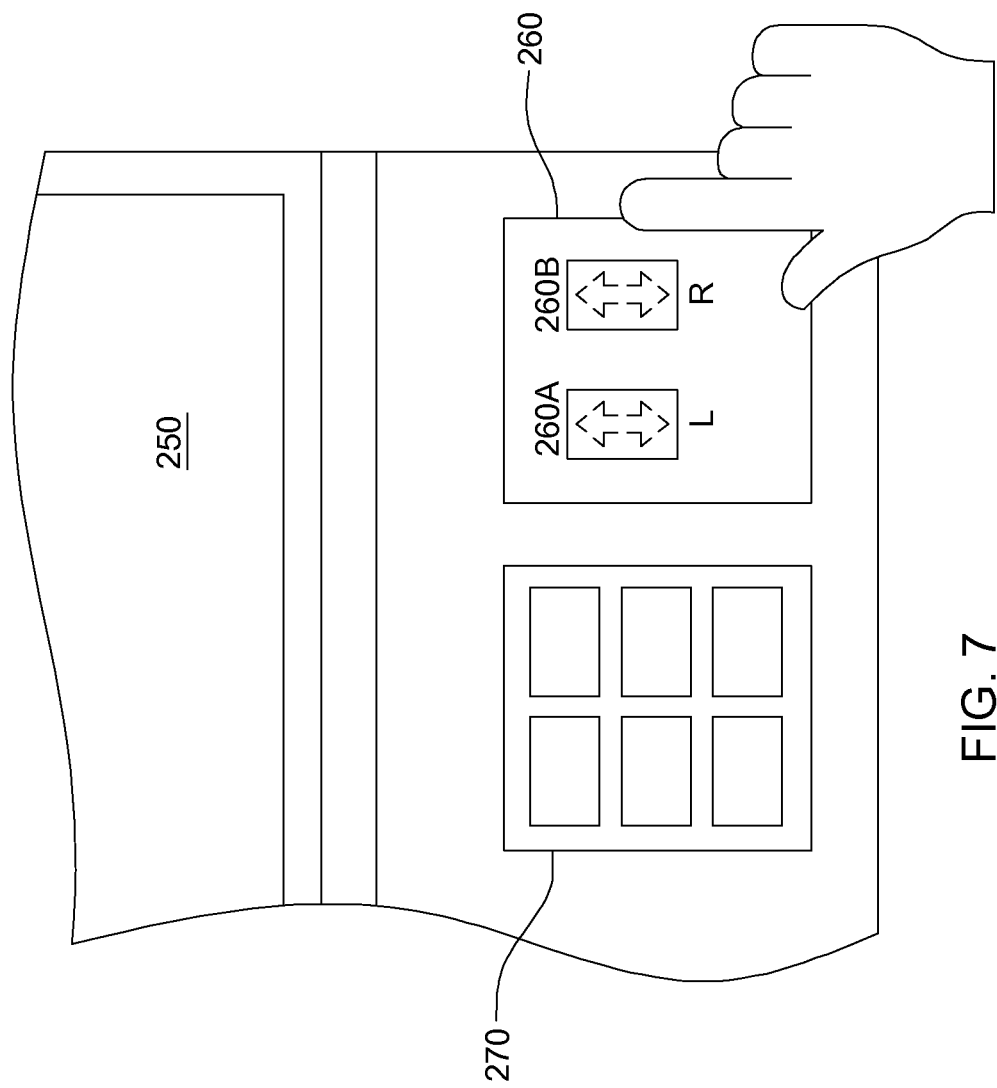
FIG. 7 depicts another example touchscreen panel that has controls for the spray nozzles, where the touchscreen includes infinity switches.

FIG. 6 depicts an example touchscreen 250 that has controls for the spray nozzles 40, where the touchscreen includes infinity switches 260A and 260B. Either the centralized computer display 70 or computerized device (e.g. tablet, cellphone, PDA, watch, necklace, and so on) has computer operating systems that support a touchscreen 250 such as through a GUI or a mobile app. Although a regular personal cellphone may be used, a dedicated computerized device is generally used in the field because the operators may be spraying chemicals that they rather not splash on personal cellphones, tablets, etc. The infinity switches 260A and 260B and companion switches 220 (e.g. 220A, 220B, . . . 226A, 226B) on the example touchscreen 250 function in a manner akin to the aforementioned methods for the physical infinity switches 60A and 60B and their companion switches. Depending on the touch software interface available (e.g. mouse emulator), a physical scroll wheel as depicted in FIGS. 3 and 4, is implemented for example as a dial wheel finger gesture 210 as shown in FIG. 6 or as a linear scroll-wheel swipe finger gestures 260 as shown in FIG. 7. The infinity effect of the wheel is achieved through a wrap-around function in the software. If the computerized devices with touchscreen 250 are used in a traveling sprayer vehicle 10 over rough terrain, the vibration of the sprayer 10 may make it difficult to accurately dial or scroll-swipe to a desired nozzle 40 or spray section 30. The tactile sensitivity of the touchscreen is lowered. Sensor de-jittering, filtering or averaging methods are activated in the computer's algorithms to reduce a likelihood of false activation or motion of the companion switches 220 or infinity switches 260A and 260B. Alternatively, voice activation serves as a substitute for touchscreens in order to enable and disable specific nozzles 40 or spray sections 30. Voice recognition software has become very good that it can readily recognize commands such as "nozzle," "six," "seven," when referring to nozzle 67 for example. Laptops, cellular handsets or smartphones have such built in voice features that are combined with the (wireless) apps for spray-related enablement/disablement. Operating systems (e.g. Android, Apple, Microsoft Windows, UNIX, etc.) provide product development kits (PDKs) offering canned high-level applications or subroutines that a program developer can readily use to implement an APP. For instance, a Smart-spray APP can control sections or nozzles that recognizes or senses gestures, finger motion, scrolling, push motions on a computer screen and voice commands through the microphone receiver that are associated with the underlying hardware and electronics circuits in the computer or handheld devices that actuate sensors and receive information from detectors. Both the touchscreen individual gestures (dial, push, scroll-swipe) or the voice command activation are usually performed serially because there is only one master CPU in the computerized device, unlike physical dual scroll switches that usually can both be scrolled simultaneously. The physical switches tend to be physically wired to different sections or nozzles so that the physical switches can operated independently. Alternatively, in some embodiments, the touchscreen includes independent, separate underlying matrices so that multiple gestures are processed simultaneously.

Figure 8:
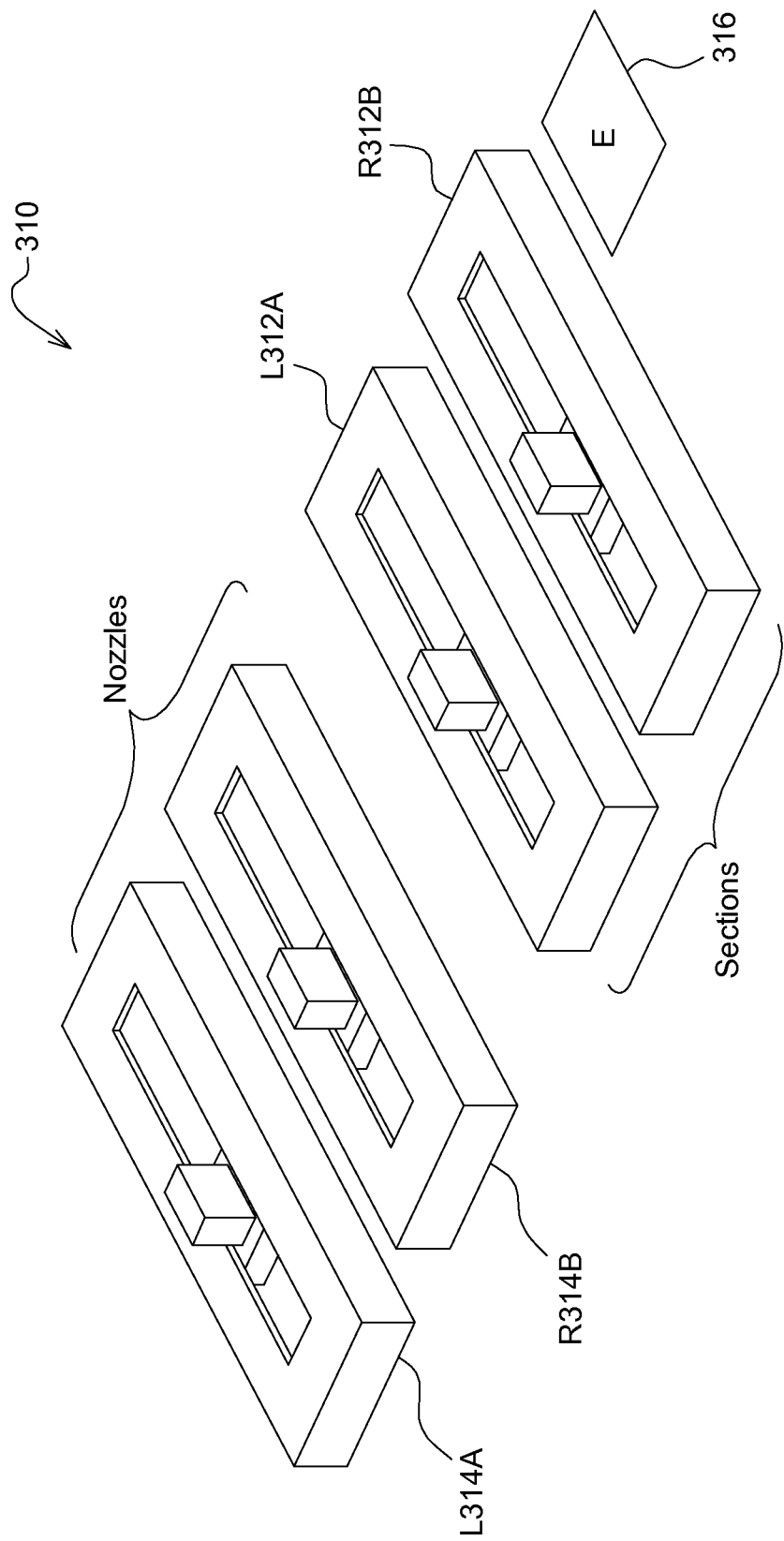
FIG. 8 depicts example slide switches.

FIG. 8 depicts another example switch 310 that may be substituted for the infinity switches such as ones shown in FIG. 3 or FIG. 5. A slide switch 310 is an alternative to infinity switches such as scroll wheels and dial wheels. The slide switch 310 has a finite travel length between two end-points and can be implemented either as a physical switch or as a switch in software. The physical version is finite, but the software version may either be finite or infinite (if the software instructions include wrap-around). For spray section control, especially when there are only 10-15 sections or fewer, a slide switch 310 works well. Longer slide switches 310 readily have enough resolution or granularity to allow precise selection and control of a particular spray section 30. Furthermore, status indicators on a display screen 70 or nozzles' LED lights can be used to confirm or help guide the selection to the desired spray section 30. Alternatively, the slide switches may be visually marked (e.g. like a ruler) so that an operator can gauge which spray sections or nozzles have been turned ON or OFF. One example marking scheme is to mark, say, 0-9 along the full length of travel of the slide switch 310. The "0" indicates that all of the devices (sections or nozzles) are OFF, "1" indicates that device 1 is ON, "2" indicates that both devices 1 and 2 are ON, and so forth.

Two slide switches 312A and 312B are used to control the left side and right side spray sections 310, respectively. To control particular nozzles 40 within a spray section 30, switches 312A and 312B are each associated with additional slide switches 314A and 314B, respectively; switches 314A and 314B are electrically associated with nozzles 40. One electrical implementation is through address decoders and de-multiplexers, that decodes the coarse (section) and fine (nozzles) selected addresses and demuxes to communicate with and operate a particular nozzle. There is also a companion switch 316 to select between section control and nozzle control. Each section control slide switch has an associated nozzle control slide switch (e.g. 312A with 314A). The companion switch 316 enables/disables (i.e. chooses between) coarse and fine selection. If fine selection companion switch 316 is selected, then the nozzle slide switches 314A and 314B are enabled so that nozzles 40 associated with a particular spray section 30 are individually addressable by moving the nozzle slide switches 314A or 314B to a particular nozzle number. There is the same number of nozzles 40 grouped within each section 30, except perhaps the endpoint sections, so that nozzle slide switches 314A and 314B each govern the same number of nozzles per section. So long as the number of nozzles 40 within each section 30 is relatively small (e.g. less than 20), a longer slide switch readily has sufficient resolution to precisely address a particular nozzle 30. Example longer slide switches include electric slide potentiometers or rotatable circular dial potentiometers that are rated, for example, at approximately 10 KOhms and 0.1 Watts, and have about 1.5-2 inches overall travel length. The electric leads or pins on the back of the slide switches are readily socketed into or soldered onto circuit boards that lie underneath the armrest cover. Like dual scroll switches, dual slide switches can both be quickly operated simultaneously such as by an operator's index and middle fingers when the slide switches are arranged longitudinally-parallel and positioned slightly apart as depicted in FIG. 8.

In another embodiment, the slide switches are replaced by a pushwheel switch as those shown in FIG. 9. Since the pushwheel switch 322 has plus and minus buttons above and below the facial decimal numbers, they serve to "slide" up and down, or increase and decrease each number. Each of the four bits (decimal or hex, actually) can be assigned a purpose such as the nozzle number or spray section number or a function select. In yet another embodiment, the set of four slide switches are all replaced by scroll wheels, with two of the wheels providing coarse selection (e.g. boom sections) and two providing fine selection (e.g. individual nozzles).

In another embodiment, the example companion switch 316 that is used to toggle between spray section versus spray nozzle control is implemented as a multi-position switch such as a gear switch, a click-slide switch or a multi-selection switch or knob. Such multi-choice switches include additional options such as double the spray pressure, rotation nozzle angle, etc., along with section or nozzle choices. Alternatively, press buttons are implemented instead of multi-selection switches. The number of presses selects which function is enabled, e.g., section control, nozzle control, fluid pressure control, nozzle tip control, etc.

A desired spray pattern can be rapidly configured with the aforementioned example switches. For instance, as a sprayer 10 makes a turn, approaches an angled headland or field boundary, an operator can quickly scroll or slide certain switches to shut off particular spray sections 30 or nozzles 40 to prevent spraying in the headland or past a boundary while still providing optimum spray coverage on the rest of the field. Further, sometimes not the entire boom 22 is used so that only selected sections of the sprayer nozzles are turned on. For example, in hilly fields or where the spray area is narrower, extending the full span of the boom 22 may hinder operation and travel. Articulated booms 22 and associated articulated fluid distribution pipes are used so that during a regular spray operation, for example, an outermost wing is tucked or folded away (e.g. rearward, forward or even upward toward the sky), and the spray nozzles 40 mounted on the outermost wing portion of the boom 22 are turned off. Meanwhile, the rest of the nozzles 40 on the rest of the boom 22 (e.g. inner wing) close to the vehicle are fully extended and operate as usual.

Operators use boom spray section valve switches to quickly enable and disable solution system section nozzles. As the vehicle or boom size continue to grow and more sections are added, the number of physical switches continues to grow, making a more complex system. The rotary and infinity switches or encoders enable an operator to enable or disable multiple solution system sections or nozzles using only a few switches and buttons or GUI and apps. Other agricultural crop care situations can also benefit from the apparatus and methods described in this disclosure. For instance, the larger cultivators, mulch rippers, and seed planters have many segments and disks, shanks, harrows, rolling baskets, and seeding dispensers on the left and right wings that are mounted to or are towed by a tractor or other machine. Fast control of individual segments and individual ground engaging tools enable the machines to go over rough terrain, obstacles, apply more down-force where needed, avoid soggy ground conditions, make turns, and so on, more rapidly and effectively.

Finally, the orientation and directions stated and illustrated in this disclosure should not be taken as limiting. Many of the orientations stated in this disclosure and claims are with reference to the direction of travel of the equipment (e.g. forward is in the direction of travel). Left is with respect to the left side of the vehicle moving forward. Right side is with respect to the right side of the vehicle moving forward. But, the directions, e.g. "forward" and "left side" are merely illustrative and do not orient the embodiments absolutely in space. That is, a structure manufactured on its "side" or "bottom" is merely an arbitrary orientation in space that has no absolute direction. Also, in actual usage, for example, the boom equipment may be operated or positioned at an angle because the implements may move in many directions on a hill; and then, "top" is pointing to the "side." Thus, the stated directions in this application may be arbitrary designations. Also for example, the right hand side armrest may be swiveled around to the left side of an operator or substituted by a left hand side armrest for left-handed operators but otherwise still follow the principles outlined in this disclosure. As another example, the physical form of the buttons and switches may also vary without departing from the principles. For instances dual pushbuttons control devices may be substituted for the scroll wheels or slide controls; dual pushbuttons are often color-coded adjacent red and green buttons and the scrolling action is substituted by multiple presses of one of the buttons to turn the spray section or nozzle ON (e.g. green button) or OFF (e.g. red button). By keeping track of the number of presses, an operator may count the number of sections or nozzles that have been engaged or disengaged. To accomplish a similar keeping-track activity, the scroll wheel may be marked visually to indicate to the operator the number of scroll revolutions that occurred. Further, although the figures show spray nozzles laid out along a single axis, other layout configurations can also benefit from the discussion. For instance, rows of disks and shanks are typically arranged on several ranks of a cultivator.

In the present disclosure, the descriptions and example embodiments should not be viewed as limiting. Rather, there are variations and modifications that may be made without departing from the scope of the appended claims.

What is claimed is:

1. A controller for a spray boom of an agricultural sprayer having spray section, the controller comprising:
a first infinity switch with an actuator that enables an operating status of only a first left-side spray section with a first correlating incremental first-direction movement of the actuator and additionally enables the operating status of a second left-side spray section with a second incremental first-direction motion of the actuator, and the actuator that disables the operating status of only the second left-side spray section with a first correlating incremental opposing-direction movement of the actuator and additionally disables the operating status of the first left-side spray section with a second incremental opposing-direction motion of the actuator;
a second infinity switch with a second actuator that enables a second operating status of only a first right-side spray section with a first correlating incremental first-direction movement of the second actuator and additionally enables the operating status of a second right-side spray section with a second incremental first-direction motion of the actuator, and the second actuator that disables the second operating status of only the second right-side spray section with a first correlating incremental opposing-direction movement of the second actuator and additionally disables the operating status of the first right-side spray section with a second incremental opposing-motion of the second actuator;
wherein the first infinity switch and the second infinity switch are arranged in parallel with the actuator and the second actuator oriented in a same polarity motion direction;
wherein the first infinity switch only controls spray sections mounted on a left side of a center axis of the agricultural sprayer, and the second infinity switch only controls spray sections mounted on a right side of the center axis of the agricultural sprayer; and
wherein the first left-side spray section is positioned closer to the center axis relative to the second left-side spray section, and wherein the first right-side spray section is positioned closer to the center axis relative to the second right-side spray section.

2. The controller of claim 1, wherein the actuator and the second actuator each includes a scroll wheel, and wherein a forward turn on either the actuator or the second actuator corresponds to a same polarity whether to enable or disable the spray sections.

3. The controller of claim 1, wherein each of the spray sections corresponds to an individual nozzle.

4. The controller of claim 1, further comprising a toggle switch having at least a spray section selection and an individual nozzle selection.

5. The controller of claim 4, wherein the toggle switch further having a spray pressure or a spray rate selection.

6. The controller of claim 4, wherein the toggle switch further having a nozzle tip or a nozzle angle selection.

7. The controller of claim 1, wherein each of the spray sections addresses an individual nozzle, and wherein the controller includes a mode to enable or disable only alternate individual nozzles along the spray boom.

8. The controller of claim 1, wherein the first infinity switch and the second infinity switch each comprises a slide switch, and a forward slide on either slide switch corresponds to a same polarity whether to enable or disable the spray sections.

9. The controller of claim 8, further comprising a third switch associated with the first infinity switch, and a fourth switch associated with the second infinity switch, wherein the third switch and the fourth switch address individual nozzles within their corresponding spray sections that are addressed by the first infinity switch and the second infinity switch.

10. The controller of claim 1, further comprising a companion switch having a first digit selecting a sprayer function mode and the companion switch having a second digit selecting a specific spray section number or specific nozzle number, wherein the companion switch associates the first infinity switch and the second infinity switch to enable or disable a specific spray section of specific nozzle numbered.

11. The controller of claim 1, wherein the controller is located on a wireless remote device including a fob.

12. The controller of claim 1, wherein the controller is located on a computational device having a screen; and on the screen, the first infinity switch and the second infinity switch include touchscreen images that are activated by finger gestures.

13. An agricultural sprayer having a spray boom with spray sections, and a spray controller comprising:
at least a first and a second infinity switches, each having an actuator;
the at least first and second infinity switches arranged in parallel with their actuators oriented in a same actuation polarity direction;
wherein only a first spray section is enabled in a first-direction by a first correlating incremental first-direction motion of a corresponding actuator and a second spray section is additionally enabled by a correlating second incremental first-direction motion of the corresponding actuator, and wherein only the second spray section is disabled in an opposing-direction by a correlating incremental opposing-direction motion of the corresponding actuator and the first spray section is additionally disabled by a correlating second incremental opposing-direction motion of the corresponding actuator;
wherein the first infinity switch only controls spray sections mounted on a left side of a center axis of the agricultural sprayer, and the second infinity switch only controls spray sections mounted on a right side of the center axis of the agricultural sprayer; and
wherein the first spray section is positioned closer to a central section of the spray boom relative to the second spray section.

14. The agricultural sprayer of claim 13, further comprising a vehicle cab having a seat with an armrest, and wherein the spray controller is located on the armrest.

15. The agricultural sprayer of claim 13, wherein the spray controller further comprising a companion switch having spray function selections; wherein the function selections include a spray section enable and a nozzle enable; and the nozzle enable engages a selected nozzle in an instant spray section reached by an associated actuator.

16. The agricultural sprayer of claim 13, wherein parallel opposing outer edges of the first and the second infinity switches are spaced within 3 inches apart to aid simultaneous manual operation of the spray sections on the left side and the right side of the spray boom.

17. A self-propelled sprayer having a spray boom with spray sections, and having a spray controller comprising:
- a first switch and a second switch, each having an actuator;
- the first switch and the second switch being arranged in parallel with their actuators oriented in a same actuation polarity direction;
- wherein only a first spray section is enabled by a first correlating incremental first-direction movement of a corresponding actuator and a second spray section is additionally enabled by a correlating second incremental first-direction motion of the corresponding actuator, and wherein only the second spray section is disabled by a correlating incremental opposing-direction movement of the corresponding actuator and the first spray section is additionally disabled by a correlating second incremental opposing-direction motion of the corresponding actuator;
- wherein the first switch controls only the first and the second spray sections mounted on a left side of a center axis of the self-propelled sprayer, and the second switch controls only the first and the second spray sections mounted on a right side of a center axis of the self-propelled sprayer;
- wherein the first spray section is positioned closer to a central section of the spray boom relative to the second spray section; and
- wherein the actuator is a wheel or a slide strip.

18. The self-propelled sprayer of claim 17, wherein the spray sections correspond to either multiple nozzles or individual nozzles; and the spray controller further comprising a companion switch having a first digit corresponding to a sprayer function mode and the companion switch having a second digit corresponding to a specific spray section or specific nozzle number selection, and wherein the companion switch associates the first switch and the second switch to actuate specific spray sections or specific nozzles numbered.

19. The self-propelled sprayer of claim 17, wherein the spray controller further comprising visual indicators associated with an enablement status of spray sections, wherein the visual indicators include lights mounted on nozzles or display screen graphics.

20. The self-propelled sprayer of claim 17, wherein the spray controller is mounted on a wireless remote device.

* * * * *